Dec. 8, 1959  S. C. SHAPPELL  2,916,603
WELDING METHOD AND APPARATUS
Original Filed Oct. 29, 1956  2 Sheets-Sheet 1

Fig_1

INVENTOR
STANLEY C. SHAPPELL
BY Joseph C. Ryan
ATTORNEY

INVENTOR
STANLEY C. SHAPPELL
BY Joseph C. Ryan
ATTORNEY

United States Patent Office 2,916,603
Patented Dec. 8, 1959

2,916,603

WELDING METHOD AND APPARATUS

Stanley C. Shappell, West Boxford, Mass., assignor, by mesne assignments, to Sylvania Electric Products Inc., Wilmington, Del., a corporation of Delaware Original application October 29, 1956, Serial No. 618,790. Divided and this application March 17, 1958, Serial No. 721,833

4 Claims. (Cl. 219—78)

This invention relates to the manufacture of electrical devices provided with base pins through which lead-in wires extend, and more particularly to a method of and apparatus for welding the lead-in wires to the base pins.

In the manufacture of electrical devices, such as fluorescent lamps for example, each end of the lamp envelope is provided with a base having electrical contact pins extending therefrom. Lead-in wires, projecting from each end of the lamp envelope, are threaded into and through the base pins, after which the lead-in wires are secured to the base pins and the base secured to the lamp envelope. In my copending application, Serial Number 618,790, filed October 29, 1956, entitled "Base Threading and Welding Method and Apparatus," a method of and an apparatus for threading, and a method of and apparatus for welding are disclosed. This application is a division of that application, being directed to a method of and appartus for welding the lead-in wires to the base pins.

In the embodiment of my invention shown in the parent application, an electrical device, such as a fluorescent lamp for example, having a pair of lead-in wires projecting from each end thereof is held intermediate its ends by a pair of arms. A threader and a lamp base are disposed in axial alignment with the lamp at each end thereof and in proximity thereto, the threader being located between the end of the lamp and the base. The arms which hold the lamp are actuated to revolve the lamp about an axis, and the threaders are advanced into encompassing relationship with respect to the lead-in wires projecting from the ends of the revolving lamp to draw the lead-in wires into axial alignment with their respective pins in the lamp bases. After the threaders have been advanced a distance sufficient to effect entry of the lead-in wires into their respective base pins, the threaders are withdrawn from axial alignment with the lamp, revolving of the lamp is terminated, and the bases are advanced into engagement with the ends of the lamp to effect advancement of the free ends of the lead-in wires through their respective base pins to complete the threading operation. The lamp is then advanced to a position where each end thereof is in operative relationship with respect to a welding unit which effect a welding of the lead-in wires to the base pins and a severance of the excess part of the lead-in wires.

One of the features of my invention is the utilization of a part of the work, viz., the lead-in wire, as a switch for opening and closing the welding circuit.

Another feature is the elimination of the usual requirement for trimming the lead-in wires, after threading and before welding.

In accordance with the principles of my invention, a welding electrode is disposed in the path through which a lead-in wire projecting from a base pin is caused to pass. When the lead-in wire moves into engagement with the welding electrode, it closes the welding circuit and permits the condenser in the welding circuit to discharge. Discharging of the condenser effects, almost simultaneously, a severing of that portion of the lead-in wire which extends beyond the face of the welding electrode, and a fusion of that portion of the lead-in wire lying between the tip of the base pin and the electrode to the base pin. In the specific embodiment of my invention shown in the accompanying drawings, the apparatus shown is arranged to effect, sequentially, the welding of a pair of lead-in wires to the pair of pins provided therefor in a lamp base.

In the accompanying drawings, Figure 1 is an end view of a pin welding unit and a fregmentary detail of a lamp head arm assembly moving into operative relationship with respect thereto.

Figure 1:
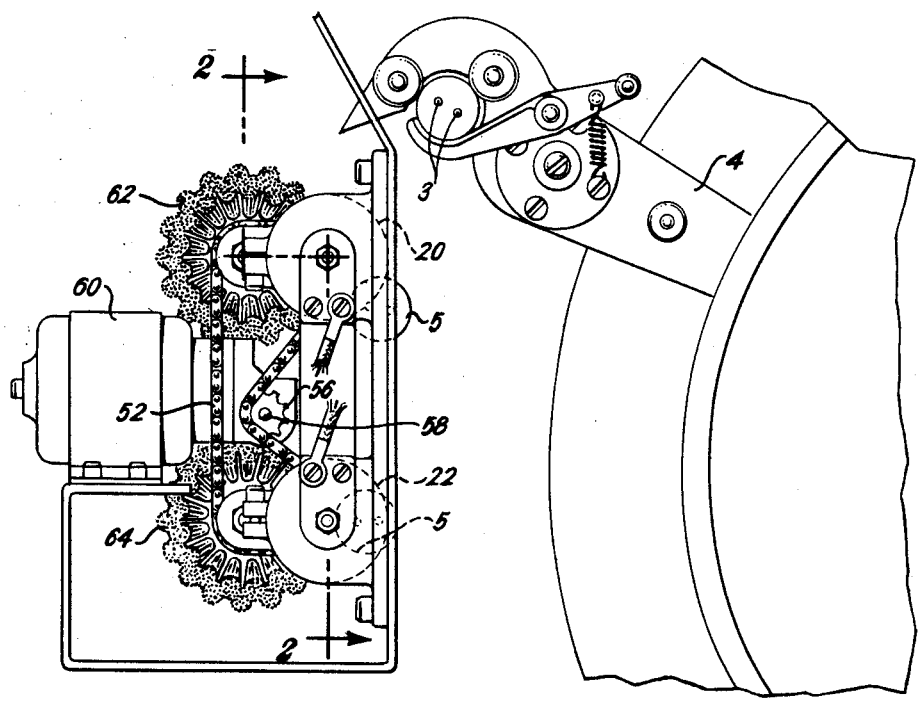

Referring now to the drawings, particularly Figure 1, the welding unit comprises an electrode 20 which is disposed in the path through which one of the lead-in wires 3 travels and an electrode 22 which is disposed in the path through which the other lead-in wire 3 travels, as the arm 4 carries the lamp tube 1 with base 5 disposed on an end thereof through the operating cycle of the apparatus. The electrodes 20, 22 are of graphite, carbon or the like, and are preferably of non-metallic material in order to avoid welding of the lead-in wires thereto.

Figure 2:
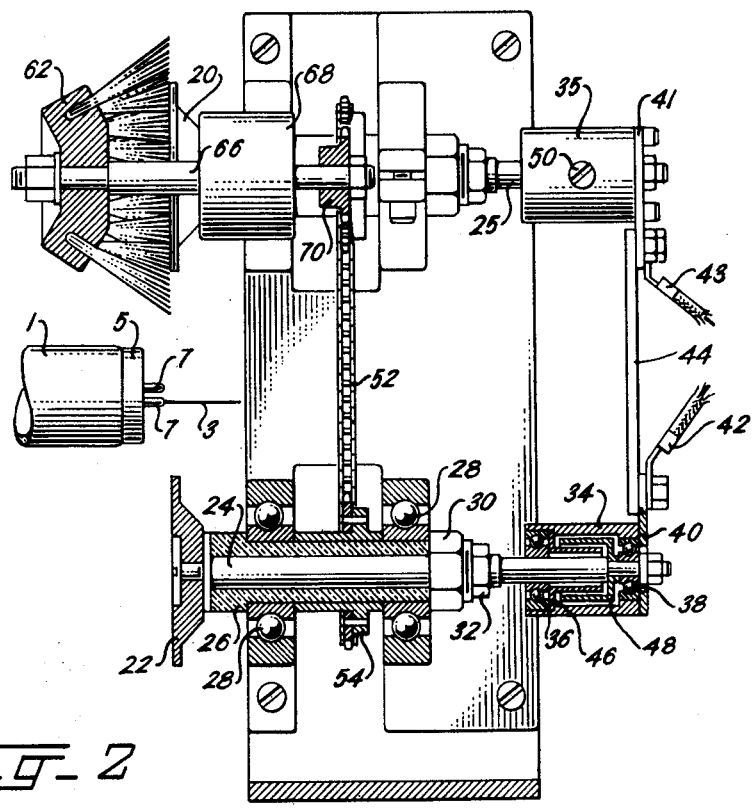
Figure 2 is an elevational view, partly in section, of the pin welding unit, looking in the direction 2—2 of Figure 1.

Since the electrode assemblies are the same, only one will be described, reference being made particularly to Figure 2. The electrode 22 is mounted on one end of a spindle 24 which extends through a sleeve 26 of insulating material and is rotatable therewith in bearings 28. Nut 30 threaded on sleeve 26 prevents lateral displacement of sleeve 26 and nut 32 threaded on spindle 24 prevents lateral displacement of spindle 24. A shell 34, supported in sealed bearings 36 and 38 on spindle 24, has a plate 40 mounted thereon. Terminal 42 is mounted on plate 40. A torque arm 44 of insulating material connects plate 40 attached to shell 34 to plate 41 attached to shell 35 to prevent the shells 34 and 35 from rotating on their respective spindles 24 and 25. A cup 46 is press fitted in the shell 34, and a cup 48 is press fitted on spindle 24. The chamber in each of the shells 34 and 35 is provided with a filling of mercury which is introduced thereinto through an aperture which is provided with a plug 50. This provides means for establishing and maintaining the electrical circuits from terminals 42 and 43 through the spindles 24 and 25 to electrodes 22 and 20 respectively.

Rotation of spindle 24 is effected by chain 52 which connects sprockets 54 on sleeve 26 to sprocket 56 (Fig. 1) on drive shaft 58 of motor 60. The spindle 25 is also rotated by this same chain drive through a sprocket (not shown) mounted thereon.

Cleaning of the electrodes 20 and 22 is effected by brushes 62 and 64 respectively. Referring now particularly to Figure 2, brush 62 is mounted on spindle 66 which is rotatably supported in bearings in bearing housing 68. A sprocket 70 mounted on spindle 66 meshes with chain 52, thereby providing means for rotating brush 62. Similar means are employed for rotating brush 64.

Welding current may be supplied to each of the electrodes 20 and 22 through their respective terminals 43 and 42 by any suitable means. For example, each of the terminals 42 and 43 may be connected directly to one side of a condenser which discharges immediately when a lamp lead-in wire is brought into contact with the face of one of the electrodes 20, 22. Connection to ground is effected through the base clamping device (158 in Fig. 8 of the parent case, not shown here) within which the base 5 is held. Any suitable means, well known to those skilled in the art, may be employed to recharge the condensers after each welding operation.

Figure 3:
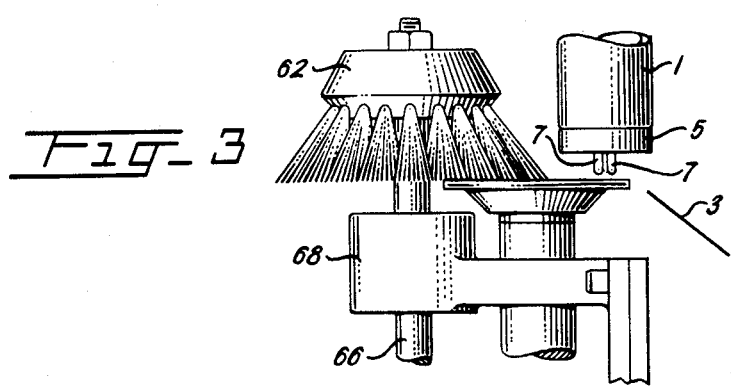
Figure 3 is a fragmentary detail of the pin welding unit electrode assembly.

Welding of one of the lead-in wires to one of the base pins 7 through which it extends is effected by the electrode 20 when the lead-in wire moves into engagement therewith. Welding of the other lead-in wire to the base pin through which it extends is effected by the electrode 22 when the lead-in wire moves into engagement therewith. As shown in Figures 2 and 3, the electrodes 20 and 22 not only effect a welding of the lead-in wires to the base pins but they also effect the desired severing of the un-needed portions of the lead-in wires, thus eliminating the requirement for a separate lead-in wire cutting operation prior to welding.

What I claim is:

1. The method of welding a lead-in wire, projecting substantially axially from an electrical device and extending through a pin of a base with which the electrical device is provided, to the pin through which it extends, said method comprising effecting relative transverse movement between a welding electrode and that portion of said lead-in wire which extends outside and beyond said base pin to bring them into engagement with one another at a point intermediate the ends of said lead-in wire, whereby the welding electrode effects severance of a part of said portion of said lead-in wire which extends outside and beyond said base pin, and welding of the remainder of said portion of said lead-in wire to said base pin.

2. Apparatus for welding a lead-in wire, projecting substantially axially and for a substantial distance from the tip of a base pin of an electrical device, to said base pin, said apparatus comprising: a welding electrode lying in the path of said projecting lead-in wire; and means for advancing said electrical device transversely with respect to said welding electrode to bring said projecting lead-in wire into engagement intermediate its ends with said welding electrode whereby a portion of said projecting lead-in wire is severed and the remainder of said projecting lead-in wire is fused to said tip of said base pin.

3. Apparatus for sequentially welding a pair of lead-in wires, projecting substantially axially from the tips of a pair of base pins of an electrical device, to said base pins, said apparatus comprising: a first welding electrode lying in the path of one of said projecting lead-in wires; a second welding electrode lying in the path of the other of said projecting lead-in wires; and means for advancing said electrical device to sequentially bring said one and said other of said projecting lead-in wires into engagement with said first and said second welding electrodes respectively whereby fusion of said projecting lead-in wires to said base pins is effected.

4. Apparatus for sequentially welding a pair of lead-in wires, projecting substantially axially and for a substantial distance from the tips of a pair of base pins of an electrical device, to said base pins, said apparatus comprising: a first welding electrode lying in the path of one of said projecting lead-in wires; a second welding electrode lying in the path of the other of said projecting lead-in wires; and means for advancing said electrical device transversely with respect to said welding electrode to sequentially bring said one and said other of said projecting lead-in wires into engagement intermediate their ends with said first and said second welding electrodes respectively whereby a portion of each of said projecting lead-in wires is severed and the remainder of each of said projecting lead-in wires is fused to the tip of its respective base pin.

References Cited in the file of this patent

UNITED STATES PATENTS 2,749,528    Albrecht _____ June 5, 1952